A. G. PICKARD.
PHOTOGRAPHIC CAMERA.
APPLICATION FILED SEPT. 13, 1912.

1,061,115.

Patented May 6, 1913.

2 SHEETS—SHEET 1.

WITNESSES

INVENTOR
Arthur Gray Pickard

A. G. PICKARD.
PHOTOGRAPHIC CAMERA.
APPLICATION FILED SEPT. 13, 1912.

1,061,115.

Patented May 6, 1913.

2 SHEETS—SHEET 2.

WITNESSES

INVENTOR
Arthur Geray Pickard

UNITED STATES PATENT OFFICE.

ARTHUR GRAY PICKARD, OF ALTRINCHAM, ENGLAND.

PHOTOGRAPHIC CAMERA.

1,061,115.  Specification of Letters Patent.  Patented May 6, 1913.

Application filed September 13, 1912. Serial No. 720,242.

*To all whom it may concern:*

Be it known that I, ARTHUR GRAY PICKARD, a British subject, residing at Altrincham, county of Chester, England, have invented certain new and useful Improvements in Photographic Cameras, of which the following is a specification.

This invention relates to photographic hand cameras in which the lens is mounted in a series of concentric tubes working telescopically one within the other to be compressed into narrow compass.

In constructing the camera or lens with the shutter fitted behind the lens with oscillating leaves on the lens tube the shutter leaves and operating levers are set or mounted on a flange on the lens tube facing the lens. And on the back of the flange of the second ring a sliding piece is mounted having a slot which engages with a pin on the operating lever of the shutter and a pin projects to the exterior by which this slide is moved. An eccentric for controlling the duration of exposure is also mounted on the flange of the second ring. To prevent rotation of the lens tube relatively to the second ring which would throw the several parts of the shutter out of register the lens tube is fitted with a feather or key the second ring being provided with a slot to slide over the key. This construction prevents the shutter being operated when the camera is folded or closed.

This invention consists in the construction and arrangement of parts for fitting a shutter thereto as will be hereinafter described with reference to the accompanying drawings which are drawn to an enlarged scale.

Figures 1, 2:
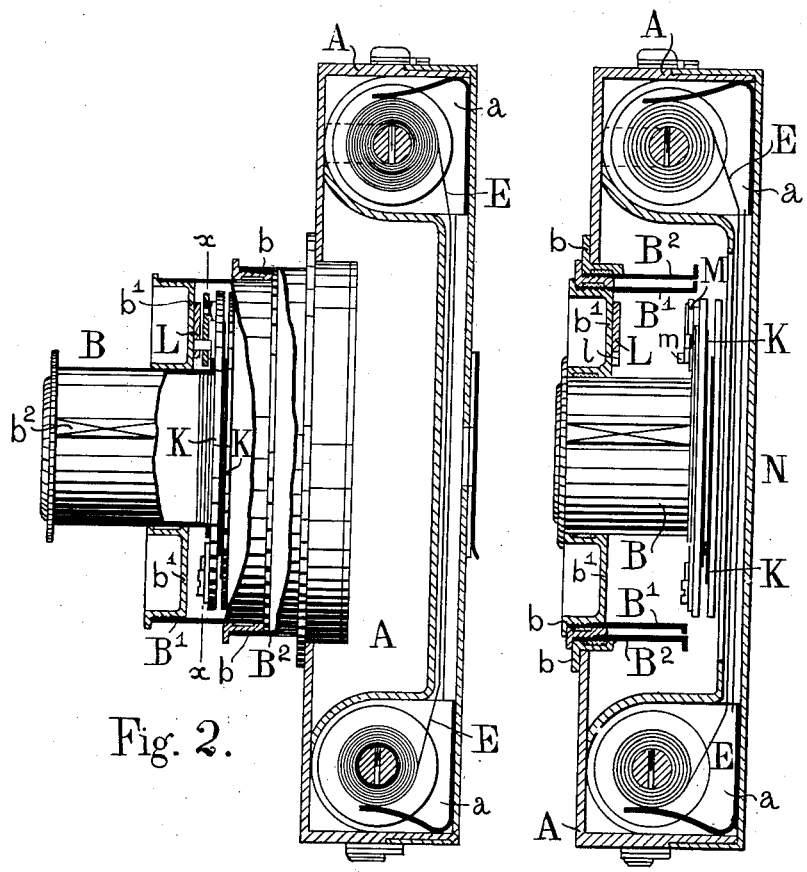
Figure 6:
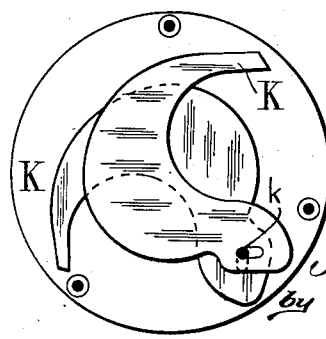
Figure 3:
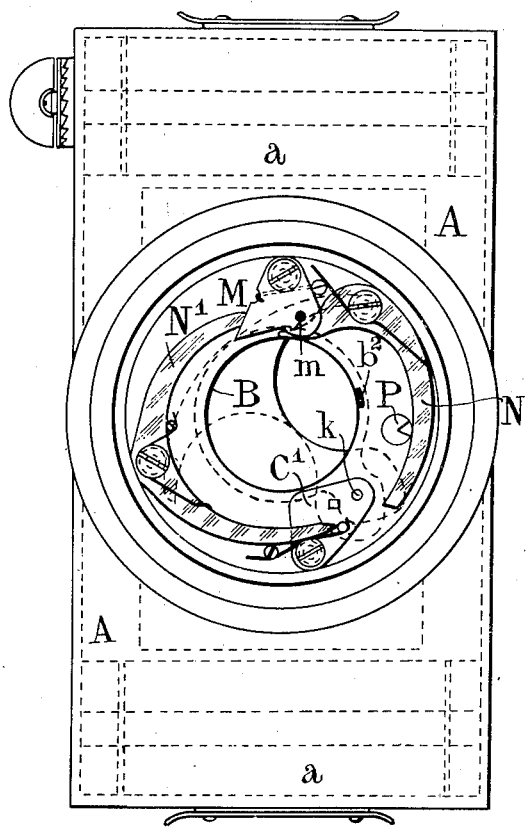
Figure 4:
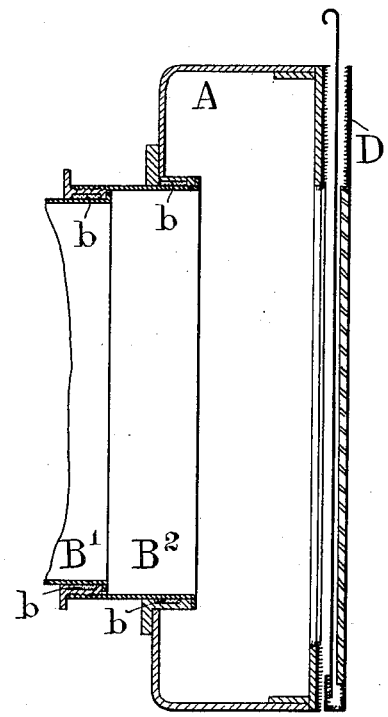
Figure 5:
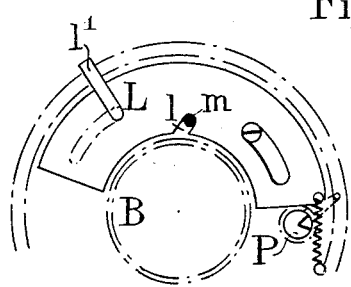

Figure 1. is a sectional elevation of camera and lens in folded or closed position as adapted for shutter carried on lens tube. Fig. 2. is a sectional elevation of same in extended position. Fig. 3. is a front elevation partly in section on line x—x Fig. 2. Fig. 4. is a sectional elevation of plate holder camera to which the invention may be applied. Fig. 5. is a front elevation of part of shutter. Fig. 6. is a front elevation of shutter leaves.

The camera is constructed with a box body A of sheet metal, wood or other suitable material preferably rectangular and of a form to receive either film E or plate holder D. A series of concentric rings or telescopic tubes B B' and B² (three being shown in the drawings but a greater number may be employed) are fitted into the front of the narrow box body A in the central one B of which the lens C is mounted. The rings B B' B² are fitted one inside the other and capable of longitudinal movement the joint between one ring and the next being packed with a piece of plush velvet or similar material b to render the joint light tight. The telescopic rings or tubes B B' B² fold inward almost against the film or plate and can be readily drawn out as in Fig. 2. without disturbing the shutter.

The camera is fitted with a shutter (of an ordinary type) with two oscillating leaves K carried on the inner end of the lens tube or ring B. The shutter leaves K are operated and released by an operating lever M provided with a pin m, two levers N, N' one at either side, and a lever C' which carries the pivot k of the oscillating shutter leaves K all these levers being set on the front of a flange on the lens tube and facing the lens. On the back of the flange b' of the second ring B' a sliding piece L is mounted with slot l which when the lens is extended engages with the pin m on the operating lever M. A pin l' projects to the exterior by which the slide L is moved to operate the lever M and through it the shutter. An eccentric P is also carried on the flange b' by which the lever N is controlled for "time" and "instantaneous" exposures.

To prevent rotation of the lens tube relatively to the ring B' which would throw the part of the shutter carried by the tube out of register or alinement with the part carried by the flange b' the lens tube is fitted with a longitudinal feather or key b² and the flange b' of the ring B' is provided with a slot to slide over the key and prevent rotation.

It will be seen that when the camera is in the folded or closed position and the parts of the shutter separated as in Fig. 1, there is no possibility of operating the shutter.

What I claim as my invention and desire to protect by Letters Patent is:—

1. In a photographic hand camera the combination with a narrow camera body, a series of concentric telescopic tubes fitted thereto, and a lens carried by the center tube of an oscillating shutter formed in two separate parts the oscillating leaves being carried upon the lens tube and the controlling slide and connecting pin carried on the back of the second concentric ring substantially as described.

2. In a photographic hand camera the combination with a narrow camera body, a series of concentric telescopic tubes fitted thereto, and a lens carried by the center tube of the shutter leaves K and operating and releasing mechanism mounted on the lens tube and a key on the tube to prevent rotation, a controlling slide L on the second tube to engage the operating lever M of the lens tube and a key-way-slot to receive the key K substantially as described.

3. In a photographic hand camera the combination with a narrow camera body, a series of concentric telescopic tubes fitted thereto, and a lens carried by the center tube of oscillating shutter leaves and operating levers mounted on the lens tube, a movable actuating slide or mechanism on a concentric ring through which the lens tube slides to engage the operating levers and means to prevent rotation of the lens tube relative to the concentric ring substantially as described.

4. In a photographic hand camera the combination with a narrow camera body, a series of concentric telescopic tubes fitted thereto, and a lens carried by the center tube of oscillating shutter leaves K, a lever M provided with a pin $m$, and two levers N N' one at either side thereof to operate and release the shutter leaves and a lever C' to which the oscillating leaves K are pivoted on the lens tube and facing the lens, and a sliding controlling piece L fitted to the flange $b'$ of the ring B' with slot $l$ to engage the pin $n$ when the lens is extended and a pin $l'$ projecting to the exterior by which the slide L is moved to operate the lever L and by it the shutter substantially as described.

In testimony whereof I have hereunto set my hand in presence of two subscribing witnesses.

ARTHUR GRAY PICKARD.

Witnesses:
J. OWDEN O'BRIEN,
GEO. H. O'BRIEN.